Aug. 5, 1958 W. A. CONINX 2,845,641
VALVE CLEANING APPARATUS
Filed Jan. 21, 1955 3 Sheets-Sheet 1

INVENTOR
William A. Coninx
BY
ATTORNEY

Aug. 5, 1958 W. A. CONINX 2,845,641
VALVE CLEANING APPARATUS
Filed Jan. 21, 1955 3 Sheets-Sheet 2

INVENTOR
William A. Coninx
BY Robert M. Dunning
ATTORNEY

Aug. 5, 1958 W. A. CONINX 2,845,641
VALVE CLEANING APPARATUS
Filed Jan. 21, 1955 3 Sheets-Sheet 3

INVENTOR
William A. Coninx
BY Robert M. Denning
ATTORNEY

United States Patent Office 2,845,641
Patented Aug. 5, 1958

2,845,641

VALVE CLEANING APPARATUS

William A. Coninx, St. Paul, Minn.

Application January 21, 1955, Serial No. 483,248

15 Claims. (Cl. 15—93)

This invention relates to an improvement in valve cleaning apparatus and deals particularly with a machine which is useful in cleaning carbon deposit and other materials from the valves of internal combustion engines.

Various means have been employed for cleaning carbon deposit from the valves of automobile engines and the like. For the most part valves of this type are cleaned by chipping the carbon or other material from the valve. This operation requires considerable time and effort and is not a particularly thorough way of removing the deposited material. Due to the fact that the carbon deposit is extremely hard, difficulty is usually experienced in cleaning the valve even if the valve is soaked in a solvent material before the cleaning operation. Also, due to the fact that valves vary materially in size, shape and design, it has been difficult to produce a device which is capable of effectively cleaning valves of various types. The trouble is accentuated by the fact that the radius between the valve stem and the valve head varies materially and the head itself may be convex, concave or flat.

An object of the present invention resides in the provision of a simple and effective apparatus for cleaning the valves of internal combustion engines regardless of their size and shape and to clean off the carbon deposit and other foreign material quickly and with little effort.

A feature of the present invention resides in the provision of a valve cleaning apparatus which includes a series of angularly spaced blades designed to encircle the stem of the valve and to clean the under surface of the valve including the fillet between the valve stem and the valve head. These blades may be simultaneously spread apart during insertion and removal of the valves and are automatically engaged with the under surface of the valve head during operation of the single control lever.

A further feature of the present invention resides in the provision of valve head cleaning means which includes a series of angularly spaced discs which are pivotally supported on pivots arranged on a plane normal to the axis of the valve. The discs are each mounted upon an individually movable support and the discs of each support are of different diameter. Preferably the discs are arranged in parallel relation on opposite sides of the support and one disc is provided with a sharpened periphery while the other includes a series of teeth. The toothed blades tend to break up or crumble the deposit while the sharpened blades tend to scrape the deposit from the under surface of the valve head. The difference in radius of the discs permits at least one set of discs to engage the fillet between the valve stem and the valve head regardless of the radius of curvature of the fillet.

A further feature of the present invention lies in the provision of a means of sliding one of the blade supports in a generally radial direction upon operation of the single control lever so as to insure removal of deposit over the entire under surface of the valve.

A further feature of the present invention lies in the provision of a slidable and pivotally supported blade designed to engage the top surface of the valve head and to remove the deposit therefrom upon proper manipulation of the single operating lever.

Still another feature of the present invention lies in the provision of a pivotally supported blade engageable with the seat of the valve regardless of the angle thereof to scrape deposit from this portion of the valve.

A further feature of the present invention lies in the fact that the operating lever is rotatable between two operating positions. By rotating the operating lever about its axis through an angle of 180°, a different type of valve head cleaning tool may be employed for the valve head cleaning operation.

These and other objects and novel features of my invention will be more clearly and fully set forth in the following specification and claims.

In the drawings forming a part of the specifications:

Figure 1:
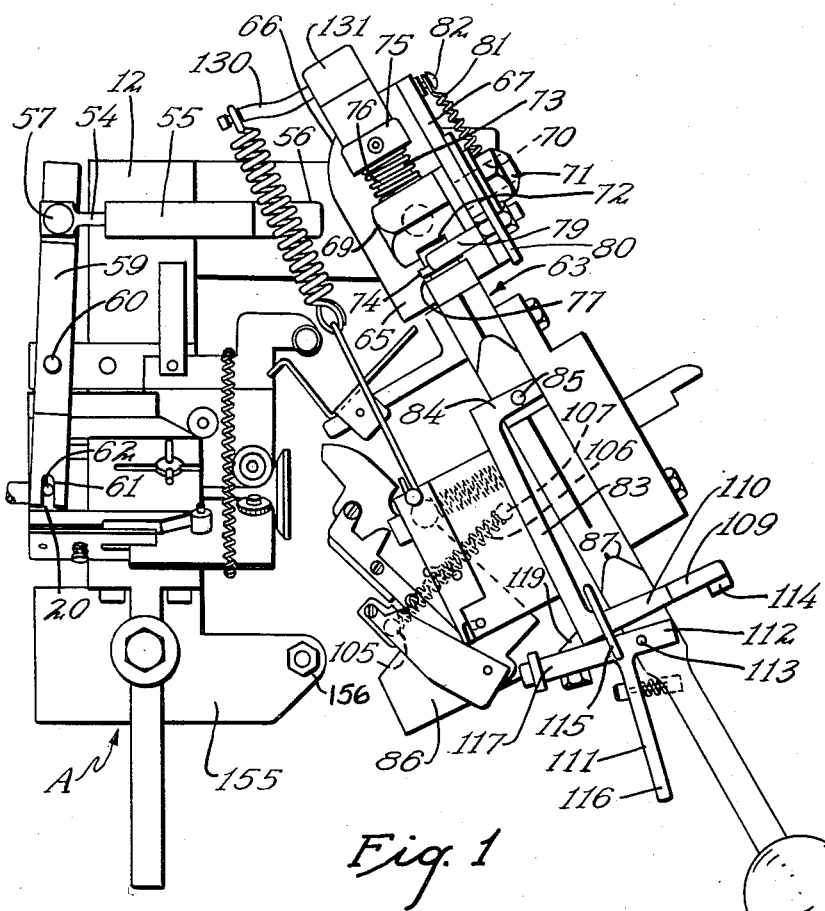
Figure 1 is a top plan view of the valve cleaning apparatus in readiness for operation.

The valve cleaning apparatus is indicated in general by the letter A and in the form of construction illustrated is used in combination with a lathe having a horizontally supported chuck, the lathe being indicated in general by the letter B. The chuck is illustrated at 10 and is supported over and between the ways 11 of the lathe B. The use of the lathe is entirely optional and the chuck 10 may be driven by any suitable source of power and the driving means may be mounted upon a base which in the construction shown would comprise the lathe ways 11. It is desirable that the apparatus be movable in a direction axial of the valve, or that the valve move axially relative to the cleaning apparatus, so that the valve stem as well as the valve head may be scraped.

The apparatus includes a frame 12 which is supported upon the lathe ways 11 or other base. The frame 12 includes a hollow sleeve like supporting member 13 having a series of angularly spaced slots 14 therein. A generally rectangular blade support 15 is mounted in each of two slots 14 to extend in a radial direction. A pin 16 holds each blade in place, the pin extending through an aperture 17 substantially larger than the pin to allow relative movement within reasonable limits.

A tubular member 19 is slidably supported within the sleeve 13. The tubular member 19 is provided with a peripheral flange 20. A series of angularly spaced guides 21 are supported upon the flange 20, the guides overlying the slots 14 and having bifurcated ends 22 which straddle the blade supports 15. The bifurcated guide ends 22 are provided with inclined extremities 23 which are engageable with rollers 24 pivotally supported on pins 25 extending through the blade supports 15.

An arm 26 is provided with an aperture 27 at one end designed to overlie the head of a projecting bolt 29 securing each guide 21 in place. Each arm 26 is slotted at its other end as indicated at 30 to straddle a corresponding blade support 15. A pin 31 extends through each blade and is engaged with the slotted end of the arm 26. A bolt 32 extends into each guide and extends loosely through the corresponding arm 26. A spring 33 is interposed between the head of each bolt 32 and the arm 26. The spring 33 thus exerts a force upon the arm 26 tending to pivot this arm in a generally clockwise direction. The slotted end of the arm engages the blade support 15 tending to urge the blade inwardly toward the axis of the structure.

Each blade support 15 is connected by a suitable pivot 35 to a pair of discs 36 one of which is interposed on each side of the blade support 15. The discs 36 project slightly beyond the blade support 15 so as to engage against the valve C beneath the head 37 of the valve and to engage the fillet 39 between the under surface of the valve head 37 and the valve stem 40.

A helical spring 41 engages notches 42 in the outer edges of the various blade supports 15 to tend to draw the blade supports inwardly. Springs 43 extend through the supporting member 13 and are interposed between the flange 20 on the tubular member 19 and an edge of the blade support 15 tending to urge the blade supports toward the under surface of the valve head 37.

Figure 5:
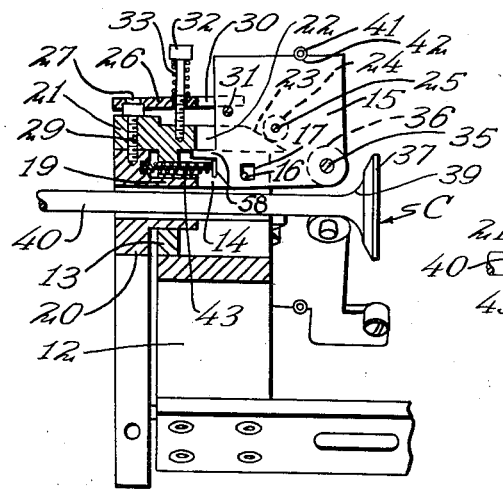
Figure 5 is a sectional view through a portion of the valve cleaning apparatus with the scraping elements released for insertion or removal of the valve, the position of the section being indicated by the line 5—5 of Figure 2.
Figure 6:
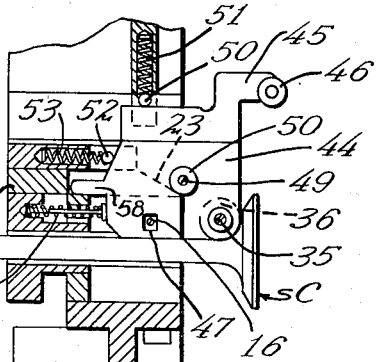
Figure 6 is a view similar to Figure 5 showing the scraping blades in contact with the valve, the sectional view being taken along the same line as in Figure 5.

With reference now to Figure 6 of the drawings, it will be noted that one of the angularly spaced blade supports differs somewhat from the other two. In other words, two of the blade supports are constructed as illustrated in Figure 5 of the drawings while the third blade support is indicated at 44 in Figure 6 of the drawings. The blade support 44 differs from the blade supports 15 by having a projecting arm 45 which projects outwardly and forwardly from the outer edge of the support. The arm 45 supports a roller 46 which may be engaged by a suitable portion of the operating lever in a manner which will be later described. The support 44 is provided with an enlarged aperture 47 similar to the previously described aperture 17 for supporting an anchoring pin 16. The support 44 includes a pivot 49 for supporting rollers 50 engageable with the inclined end 23 of one of the guides 21. Inward pressure is applied to the outer edge of the blade 44 by a ball 50 urged inwardly by a spring 51. A similar ballbearing 52 mounted in an attachment 48 to the corresponding guide 21 is urged against the rear edge of the blade 44 by a spring 53 which extends parallel to the previously described spring 43.

The blade supports 44, similarly to the blade supports 15, support discs upon a pivot 35, these discs acting to break up and scrape the deposit from the under surface of the valve head and the fillet connecting the valve head to the valve stem. A tongue 58 on each blade support 15 and 44 engages beneath a portion of the guide 21 or guide attachment 48 to limit outward movement of adjacent side of the blade support while permitting the blade supported blades to move radially a greater distance.

Figure 2:
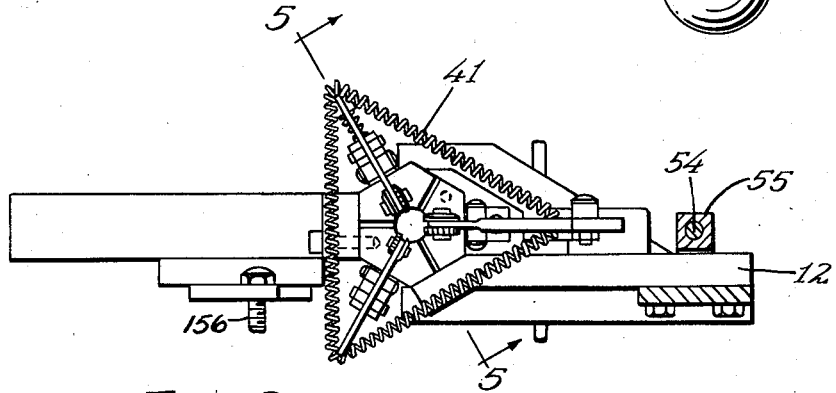
Figure 2 is an end view of a portion of the valve cleaning mechanism, the operating lever and its connected parts being broken away for the purpose of illustration.
Figure 3:
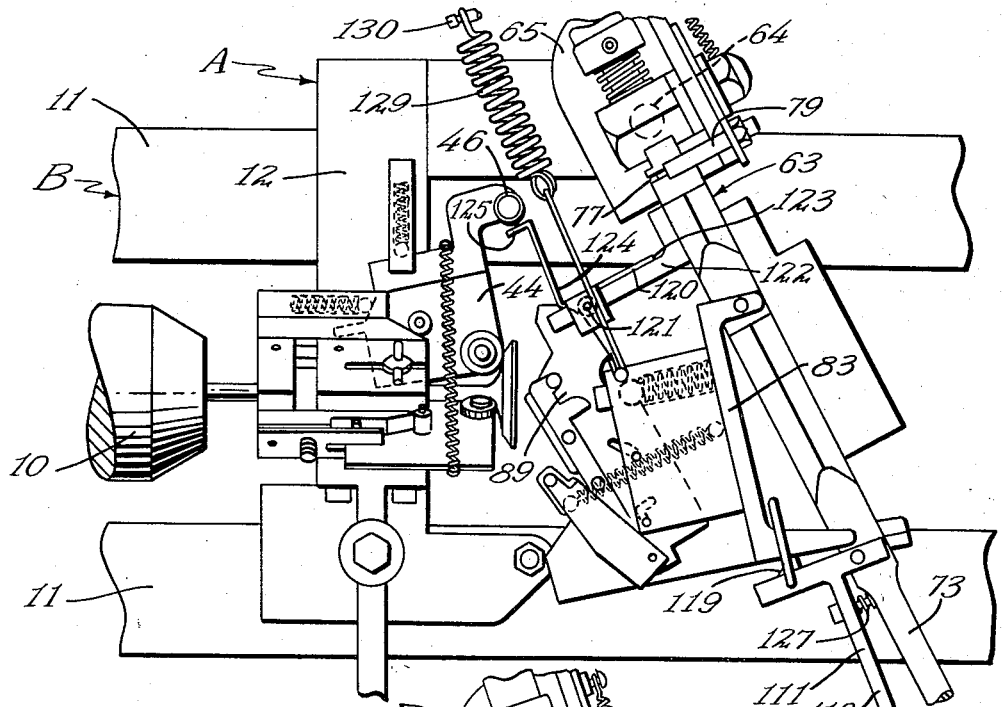
Figure 3 is a view similar to Figure 1 showing the elements in a different operating position.

An arm 54 is slidably supported by the bearing 55 mounted upon the frame 12 as best illustrated in Figures 1 and 2 of the drawings. This slide 54 is provided with a lug 56 at one end thereof while the other end is connected by ball and socket joint 57 to a lever 59. The joint provides sufficient play to accommodate the relatively slight angularity of the lever 59. The lever 59 is pivoted at 60 to a portion of the frame 12. The other end of the lever 59 is bifurcated at 61 to straddle a pin 62 on the flange 20 of the slidable tubular member 19. An operating lever, indicated in general by the number 63 is pivoted at 64 to a fixed portion of the frame 12. The operating lever 63 includes a plate 65 having a cam-shaped end 66 which is engageable with the lug 56 to pivot the lever 59 when the operating lever is swung in a clockwise direction as viewed in Figures 1, 3 and 4. Movement of the lever 59 tends to move the slidable member 19 and the guides 21 toward the blade supports 15 and 44 thereby causing the inclined ends 23 of the guides to engage the rollers 24 and to move the blade supports outwardly away from the axis of the valve.

The arm or operating lever 63 is a somewhat complex portion of the apparatus and has many parts and is capable of serving numerous purposes. The arm is mounted upon the plate 65 which has been described as pivotally connected at 64 to the frame 12. A plate 67 extends upwardly from one edge of the plate 65 and acts as a support for the major portion of the arm. A bearing 69 is provided with a shank 70 extending through the plate 67 and a nut 71 is threaded onto the shank 70 to pivotally support the bearing for movement about a generally horizontal axis.

The bearing 69 is provided on one side with a notch 72 having parallel sides. The bearing 69 is apertured to accommodate an elongated rod 73. The rod 73 is provided with an enlarged diameter portion 74 which is squared off on two sides to fit snugly into the notch 72. A collar 75 is provided on the arm 73 on the side of the bearing opposite that having the notch 72. A spring 76 is interposed between the collar 75 and the bearing 69 so as to draw the squared portion of the shaft into the notch 72 and to thereby hold the arm 73 from rotation with respect to the bearing 69.

The enlarged diameter portion 74 of the rod 73 is provided with a peripheral groove 77 which is designed to accommodate an indexing arm 79 pivotally supported upon a cam plate 80. A spring 81 is anchored at one end 82 to the bracket plate 67 and the other end of this spring 81 is attached to the cam plate 80, as best seen in Fig. 12, in a manner to draw the indexing arm 79 into the groove 77 in a manner to hold the arm 73 from longitudinal movement.

Figures 11, 12:
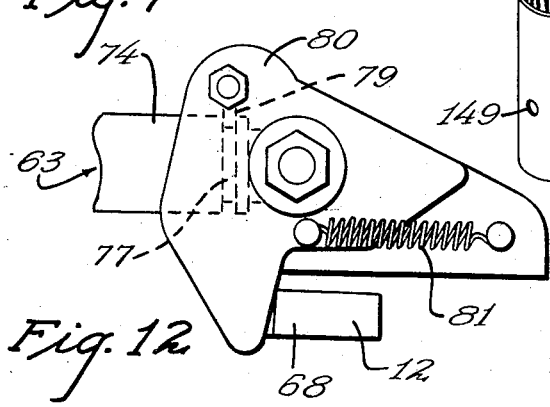
Figure 11 is a perspective view of a brush useful in cleaning the valve surfaces.
Figure 12 is an enlarged elevation view of a detail portion of the apparatus.

While the construction is not disclosed in detail in Figure 12, nonetheless due to the fact that it is an extremely important part of the structure, it should be understood that the arrangement is such that when the arm 63 is swung away from the valve C, or swung in a counter-clockwise direction as viewed in Figure 1, the cam plate 80 engages a portion of the frame 12 and pivots about the shank 70, lifting the indexing arm out of contact with the groove 77. Accordingly, when the arm 63 is not in operation, the slidable rod 73 may be pulled forwardly a distance sufficient to disengage the squared portion of the rod from the notch 72. When thus pulled forwardly, the rod 73 and the parts connected thereto may be rotated about the axis of the rod through 180°. However, when the arm is swung toward the valve to be cleaned, the indexing arm engages in the groove 77 and prevents accidental disengagement of the squared portion of the rod from the notch 72.

The rod or arm 73 supports a plate 83, the plate having a right angularly extending yoke 84 thereupon which straddles the rod 73. A pivot pin 85 connects the yoke 84 to the rod 73. The plate 83 in turn supports a horizontally extending mounting plate 86 which acts as a support for the blades which clean the upper surface of the valve head as well as the valve seat.

Figure 7:
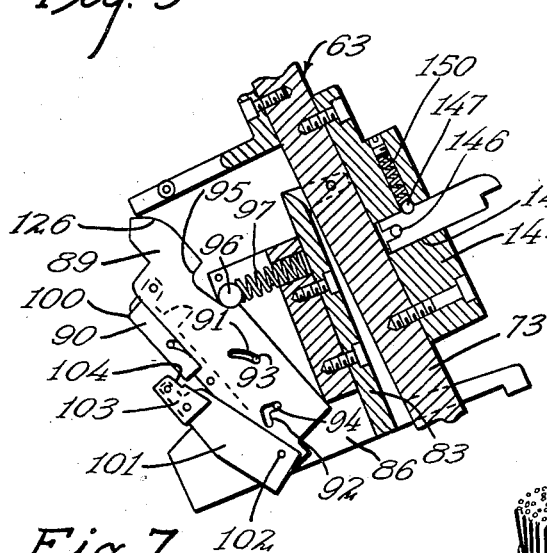
Figure 7 is a sectional view through a portion of the operating lever showing the arrangement of elements for cleaning the upper surface and the face of the valve.

As is indicated in Figure 7, the plate 86 supports a pivotally and slidably mounted blade support 89 to which is attached a blade 90 of a material sufficiently hard to resist the wearing action of the carbon deposit. The blade 89 is provided with an inclined slot 91 and an angular slot 92 through which pins 93 and 94, respectively, may extend. These slots permit restricted movement of the blade 90 and its support 89, the purpose of the arrangement being to permit the blade 90 to adapt itself to the surface of the valve head.

A cam notch 95 is provided in an edge of the blade support and a ball bearing 96 is urged by a spring 97 into this notch 95. The spring tends to hold the blade 90 with one corner 100 of the blade in position to engage approximately the center point of the valve C. However, the blade support 89 may pivot about the pin 94, the pin 93 sliding in the slot 91 and the pin 94 sliding somewhat in the slot 92 so as to permit the edge of the blade to move flat against the upper surface of the valve head or even to scrape the surface of a convex valve head.

A second blade support 101 is pivotally attached at 102 to the blade support 89. The support 101 is provided with a blade 103 attached to its non-pivoted end. The blade 103 is provided with a scraping edge 104 which is normally angularly related to the edge of the blade 90 and opposed thereto. The edge 104 is designed to scrape the seat of the valve in a manner which will be later described in detail. A downward projection 105 is provided on the end of the blade support 101 and a spring 106 connects this projection 105 with a cooperable projection 107 on the under surface of the mounting plate 86. As a result the blade support 101 is normally held in approximately the position shown in Figure 7 but may pivot in a counterclockwise direction from this position, expanding the spring 106.

The plate 83 is equipped with a hook shaped projection 109 which extends beneath the rod 73. A shorter projection 110 extends over the rod 73 so that the rod is sandwiched between the projections 109 and 110. A latch 111 is provided with spaced ears 112 forming a yoke straddling the rod 73 and a pivot 113 pivotally connects the latch lever 111 to the arm 73. The hook shaped end 114 of the projection 109 is engageable with the pivot 113 to limit pivotal movement of the plate 83 in one direction. A bearing plate 115 is mounted upon the plate 83 so that the plate 83 may be pivoted manually.

The latch lever 111 is generally L-shaped in form having a handle end 116 and a latching end 117. The latching end is provided with a wedge shaped projection 119 on its surface which is designed to engage the end of the plate 83 when the palte is swung in a counterclockwise direction to its extreme position. A generally L-shaped pushing element 120 is pivoted at 121 to a bracket arm 122 extending laterally from the rod 73 in spaced relation to, and parallel with, the mounting plate 86. This push member 120 includes an end 123 which may lie flat against the bracket arm 122 or may pivot away from the surface of the arm as preferred. The pusher also includes a right angularly extending arm 124 which extends at substantially right angles to the end 123 and is provided with an angularly bent extremity 125. When the end 123 of the pushing member is against the bracket arm 122, the extremity 125 will engage the roller 46 of the blade support 44 and pivotal movement of the arm 63 will push the blade support 44 in a radial direction away from the axis of the valve being cleaned. However, the extremity 125 will slip past the roller 46 upon continued movement of the arm 63 in a clockwise direction.

In order to hold the pushing device 120 in position to engage the roller 46, the blade support 89 is provided with a rounded extremity 126 which is engageable against the end 124 of the pushing device 120 to hold this arm with the end 123 thereof against the bracket arm 122. This normally occurs when the plate 83 is approximately in the position shown in Figure 3. Pivotal movement of the blade support 89 acts to release the pushing device 120 so that it may move past the roller 46.

A spring 127 is interposed between the handle end 116 of the lever 111 and the rod 73 so as to urge the locking projection 119 into position to lock the plate 83 from movement. A spring 129 is connected between the mounting plate 86 and an arm 130 projecting from a collar 131 on the rod 73 so as to urge the plate 83 in a clockwise direction.

Having now described the major parts of construction of this portion of my apparatus, its manner of use will now be described.

The arm 63 controlling the operation of the apparatus is swung in a counter clockwise direction so that it will not interfere with the insertion of the valve C. This action causes the rounded end 66 of the arm supporting plate 65 to engage against the end 56 of the slidable rod 54 moving this rod to the left as viewed in Figure 1. This action pivots the lever 59 in a counter clockwise direction, acting through the pin 62 to urge the tubular member 19 to the right as viewed in Figure 5. The guides 21 which are connected to the flange 20 of the tubular member 19 are simultaneously moved to the right, the tapered ends 23 of these guides engaging the rollers 24, 50 of the blade supports 15, 44 to move these blade supports outwardly from the axis of the apparatus. As a result, the stem 40 of the valve C may be inserted through the tubular member 19 and the end of the stem may be engaged by the chuck 10.

Movement of the control arm 63 in a clockwise direction acts to release the engagement of the plate end 66 from the lug 56 causing the release of pressure against the lever 59. The coil spring 41 constantly tends to draw the blade supports 15, 44 inwardly toward the valve stem 40. The springs 33 act through the lever arms 26 to urge the blade supports 15 inwardly and the spring 51 provides a similar inward force against the blade supports 44. As a result the inward pressure upon the blade supports acts through the rollers 24 to slide the tubular member 19 to the left. This action is also assisted by the springs 43.

The chuck 10 is now rotated to rotate the valve C. This action causes the disc like blades 36 to engage the under surface of the valve as well as the rounded fillet portion 39. As each blade support 15, 44 is individually movable and as the valve when engaged in the chuck is drawn against the discs 36, the discs will effectively scrape the deposit from the undersurface of the valve and from the rounded fillet.

By having discs of three different diameters, fillets of various radii can all be effectively scraped. The discs of smallest radius fit the fillets of shortest radius but engage fillets of larger radius at only one point at a time. The discs of intermediate diameter snugly fit fillets of intermediate radius and engage the fillets of smaller diameter at two spaced points. The discs of large diameter snugly fit within the larger fillets and also engage fillets of smaller radius at two spaced points.

The use of toothed or knurled discs on one side of each blade support and discs with sharpened scraping edges on the other side of the blade supports has also been found beneficial. The toothed discs tend to pulverize the deposit while the sharpened discs tend to scrape the deposit from the surfaces engaged. The two discs also tend to prevent undue strain upon the blades as any tendency for the blade supports to bend or flex tends to disengage the disc on one side of the support and more firmly engage the disc on the opposite side of the support.

From the foregoing it should be clear that during the first portion of the operation described, the under surface of the valve will be scraped free of deposit by the individually supporting discs. It will be remembered that the blade supports 15 and 44 are not firmly held from movement in a radial direction or movement in an axial direction. Thus, the coil spring 41, combined with the action of the springs 33 and 51 and the springs 43 permit the entire under surface of the valve to be cleaned. Before the operating lever 63 is swung into position to engage the upper surface of the valve, the plate 83 is swung into the position shown in Figure 1, with the latch projection 119 locking the plate 83 in this position. If the valve is of sufficiently large diameter so that the entire under surface is not scraped clear of deposit by the discs 36, the latch lever 111 is operated to permit the plate 83 to swing into the position shown in Figure 3. This action causes the blade support 89 to engage the end 124 of the pushing device 120 holding the end 123 of this pushing device against the bracket arm 122 and swinging the extremity 125 into position to engage the roller 46.

As the operating arm 63 is swung further in a clockwise direction, the extremity 125 of the pushing device 120 will engage the roller 46 and slide the blade support 44 in an outward radial direction so that the discs 36 supported by the blade support 44 will move outwardly until the entire under surface of the valve is clean.

Further pivotal movement of the operating arm 63 in a clockwise direction will cause the corner 100 of the blade 90 to engage the valve head near the center of rotation of the valve. As the swinging of the arm 63 continues, the blade 90 is drawn against the top surface of the valve C. It will be seen that the valve C may be somewhat concave, may be flat, or may be convex, as the blade support 89 pivots and slides into position to follow the contour of the head of the valve.

Figure 4:
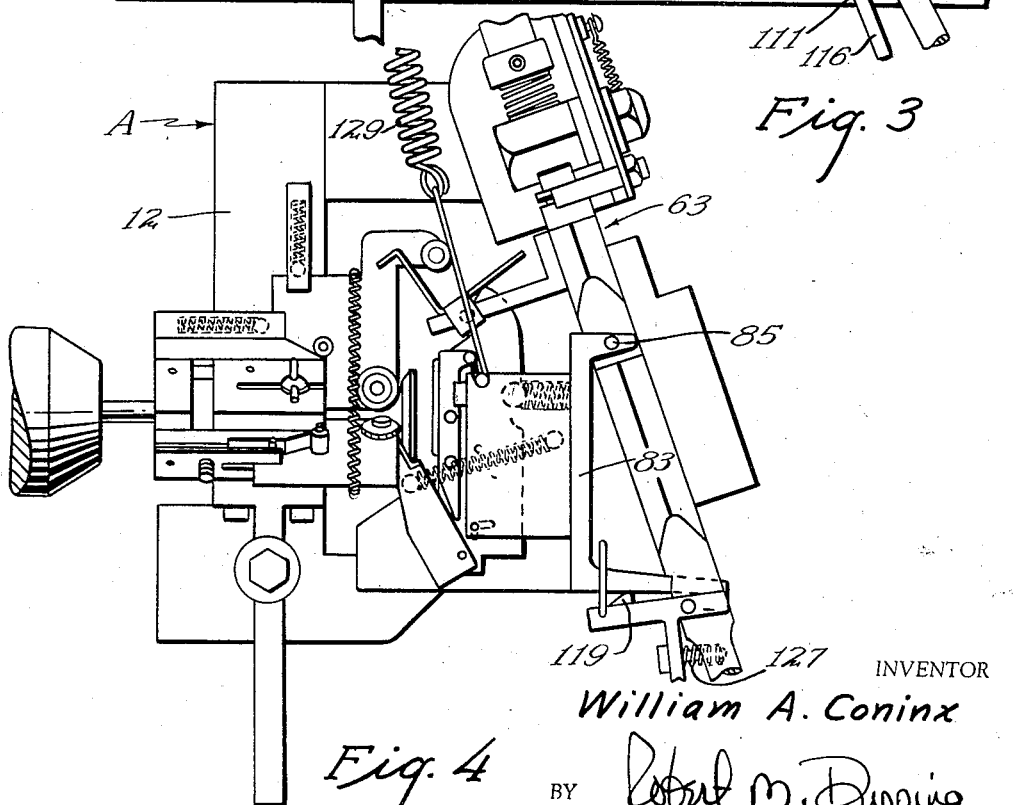
Figure 4 is a view similar to Figure 3 showing the operating parts in still another position.

As the blade support 89 pivots, it is also retracted by engagement of the rounded end 126 thereof with the pushing device 120 until the point of this end 126 passes the angled portion of the pusher and engages the arm 123 as indicated in Figure 4, holding the pusher out of the path of the roller 46 during the remainder of the operation.

As a final operation, the operating arm 63 is swung slightly in a counter clockwise direction, the blade support 101 pivoting about its pivot 102 until the blade edge 104 is flush against the valve seat. This blade edge removes any carbon deposit from the valve seat. When the valve seat is cleaned, further pivotal movement of the arm 63 in a counter clockwise direction will swing the blade support 101 until the blade becomes disengaged from the valve. Continued movement of the control arm in the reverse direction again releases the blade supports 15, 44 and the discs supported thereby from the valve. The rotation of the chuck 10 is stopped and the valve removed.

It will be seen that the entire operation is accomplished, once the valve is in place, by merely swinging the control arm first in one direction and then in the other. At the start of the operation the pressure plate 119 is operated to swing the plate 83 into the position shown in Figure 1. If the pushing device 120 is to be employed for scraping the under surface of a valve with a large head, the latch lever 111 is operated to release the plate 83 into the position shown in Figure 3.

After the surface of the valve has been cleaned, the latch lever 111 is again released so that the plate 83 can swing into the position shown in Figure 4. Thus the latch projection 119 holds the plate in two different positions relative to the rod 73.

Figures 8, 9:
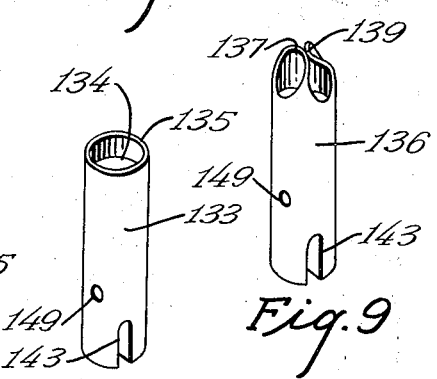
Figure 8 is a perspective view of one form of valve surface cleaning tool.
Figure 9 is a perspective view of a different form of valve cleaning tool.
Figure 10:
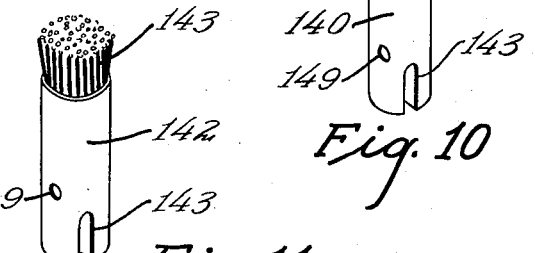
Figure 10 is a perspective view of another form of valve cleaning head.

Some valves employed in internal combustion engines have deeply hollowed upper surfaces which cannot be most effectively cleaned by the blade 90. Special tools are provided for use in such emergencies. In Figure 8 of the drawings I disclose a scraping tool 133 having a hollow head 134 encircled by a ring-shaped scraping edge 135. In Figure 9 of the drawings I disclose another scraping tool 136 having a pair of opposed, curved scraping surfaces 137 and 139 which are relatively narrow and which are designed to extend into a concave valve surface. In Figure 10 of the drawings another scraping tool 140 is illustrated, this tool having a generally straight scraping edge 141 extending substantially across the diameter of the tool. In Figure 11 of the drawings I disclose a brush holder 142 having axially projecting bristols 143 which are usually stiff wires or the like, the brush being designed to more effectively clean loose material from the valve surfaces. All of the tools are provided with a slot 143 in their shank end.

As is indicated in Figures 7 of the drawings the arm 63 is provided with a plate 144 thereupon in opposed relation to the mounting plate 86. A socket 145 is provided in the plate 144 and a pin 146 extends across the socket 145 at its base. The pin 146 is designed for accommodation into the slot 143 of one of the scraping tools.

A ball bearing 147 is urged into a suitable indentation 149 in any of the tools described to hold this tool in place. The ball bearing 147 is urged into the indentation by a spring 150 arranged at right angles to the axis of the socket 145.

As was described previously, the arm 73 is held from axial movement when the structure is in use by an indexing arm 79. This arm is automatically disengaged from a groove 77 as the control arm 63 is swung toward inoperative position. When in such a position, the arm or rod 73 may be pulled forwardly to disengage the squared portion of the rod from the notch 72 whereupon the rod 73 may be rotated 180° and again the squared portion of the rod is engaged in the notch 72. As a result of this arrangement, any of the tools shown in Figures 8 through 11 may be employed to scrape off the face or upper surface of the valve C.

It will be seen that the structure is useful on all types of valves and in most instances the entire valve cleaning operation may be completed by merely moving the control arm first in one direction and then in the other and operating the latch lever 111 at suitable points in the operation. However, in the event the valve surfaces are so peculiarly shaped that they cannot be cleaned by the blade 90, the surface of the valve may be cleaned by one of the scraping tools shown in Figures 8 through 11, the control arm may be swung into inoperative position, the slidable portion of the control lever may be pulled forwardly and the device inverted and the arm may be again swung toward the valve in order to clean the valve seat.

The frame 12 of the apparatus is equipped with a lateral extension 155 which supports a vertically movable adjustment screw 156. This screw is engageable with the laterally extending plate 86 mounted upon the operating arm. This provides a secondary support for the cutting or scraping blade and prevents the arm support from withstanding all of the strain. Furthermore, it should be emphasized that the arm 63 can be raised or lowered about its bearing stud 70, so that the entire surface of the valve may be cleaned or scraped with any of the tools described.

In accordance with the patent statutes, I have described the principles of construction and operation of my valve cleaning apparatus, and while I have endeavored to set forth the best embodiment thereof, I desire to have it understood that obvious changes may be made within the scope of the following claims without departing from the spirit of my invention.

I claim:

1. A valve cleaning apparatus for use in cleaning an internal combustion engine valve having a stem and a head, the apparatus including in combination a rotatable valve support, arm means pivotally supported for movement toward and away from the head of a valve supported by said support, a bracket pivotally supported by said arm, a blade support movably supported by said bracket, movement of said arm in one direction acting to move said blade support to scrape the head of a valve supported by said valve support, a blade upon said blade support designed to scrape the surface of the valve head as the valve is rotated, and pivotally mounted scraping means on said arm means engageable with the under surface of said head as the valve is rotated.

2. A valve cleaning apparatus for use in conjunction with an internal combustion engine valve having a stem and a head, the device including in combination a rotatable valve support, an arm pivotally supported for movement toward and away from said valve support, a blade supported by said arm on a plane through the axis of the valve and cooperatively movable against the head of the valve upon pivotal movement of said arm, means flexibly supporting said blade so that the edge of the blade may engage against a contoured valve head surface to scrape deposit therefrom as said valve is rotated and a second blade pivotally supported by said arm and individually movable with respect to the first mentioned blade, said second blade being engageable with the seat of the valve to scrape deposit therefrom.

3. A device for scraping deposit from an internal combustion engine valve having a valve stem and a valve head, the device including in combination a rotatable valve support for rotatably supporting the valve, a radially movable blade engageable with the under surface of the valve to support the same, an arm movable toward and away from said valve support, a blade supported by said arm mounting, means flexibly supporting said last named blade so that the blade edge will extend substantially on a radial plane with respect to the axis of a supported valve, said last named means supporting said blade so that the edge of the blade may change in angularity with respect to the axis of a supported valve so that the blade may follow a convex surface, a concave surface, and a flat surface.

4. The construction described in claim 3 and including means connecting said arm and said first named blade for moving said first named blade radially upon pivotal movement of said arm.

5. The construction described in claim 3 and including a third blade pivotally supported by said arm and engageable with the seat of a supported valve.

6. The construction described in claim 3 and including means for rotatably supporting said arm for rotation about its axis, and including a second valve head scraping device supported by said arm in angular relation to said last named blade.

7. A valve cleaning device for cleaning an internal combustion engine valve having a valve stem, a valve head, and a valve seat encircling said head, the device including in cooperative combination means for rotatably supporting said valve for rotation about its axis, radially axially movable valve surface contacting means engageable with the under surface of the valve head for scraping deposit therefrom, blade means engageable with the upper surface of the valve head for scraping deposit therefrom, and additional pivotally mounted blade means engageable with the seat of the valve for scraping deposit therefrom, either of said blade means being selectively engageable with said valve head simultaneously with said means engageable with the under surface of the valve head.

8. The construction described in claim 7 and including flexible and adjustable mounting and supporting means for successively engaging and disengaging said valve surface scraping means from engagement with a supported valve.

9. The construction described in claim 7 and in which the said blade means engaging the upper surface of the valve head for scraping the same is pivotally supported upon a plane extending substantially radially from the axis of the valve.

10. A valve cleaning apparatus for removing carbon from the head and stem portions of an internal combustion engine valve comprising in combination, a frame, a valve support means on said frame for mounting and rotating a valve stem therein, a plurality of angularly spaced and relatively axially and radially movable supports mounted about said valve support means, associated slide and guide elements for controlling the relative axial and radial movements of said supports, carbon cleaning elements mounted on said supports for engagement against the valve stem, the undersurface of a valve head and the connecting fillet between the said stem and the said undersurface, operative lever means connected to said frame, supporting means mounted on said lever means, additional carbon cleaning element means mounted on said supporting means for engagement with the top surface of a valve, cooperably associated pusher elements actuatable by said lever means for engaging and moving at least one of said angularly spaced supports radially of the axis of a valve stem to move its carbon cleaning element over the undersurface of a valve head, a pivotal support associated with said supporting means mounted on said lever means, valve seat scraper means mounted on said pivotal support, valve top scraper means mounted on said lever means, and tensioning means cooperably associated with each of said supports and the operative relationship of the said carbon cleaning elements and scraper means mounted thereon.

11. The structure of claim 10, wherein the carbon cleaning elements mounted on said supports for engaging against a valve stem, the undersurface of a valve head and the connecting fillet between said stem and undersurface are sets of spaced discs, each set being of a different diameter to scape fillets of various radii.

12. A valve cleaning apparatus including in combination a valve support for rotatably mounting an internal combustion engine valve thereon, a plurality of angularly spaced blades arranged to radially engage the under surface of a valve supported by said support, resilient means urging said blades in the direction of said valve, cam means for overcoming the action of said resilient means, and means for actuating said cam means.

13. The construction described in claim 12 and including a pivotally mounted blade support for each blade, said cam means engaging respective portions of said blade supports.

14. The construction described in claim 13 in which the blades are in the form of discs with their peripheral scraping edges arranged in angular planes that substantially intersect the longitudinal axis of said valve.

15. The construction described in claim 12 in which said actuating means includes a control arm pivotally supported for movement toward and away from said valve and an additional blade pivotally carried by said arm and engageable with the seat of said valve to clean the same.

References Cited in the file of this patent

UNITED STATES PATENTS

| 1,507,771 | Ferris | Sept. 9, 1924 |

FOREIGN PATENTS

| 25,931 | Great Britain | of 1913 |
| 321,235 | Italy | Sept. 27, 1934 |